US012810686B2

(12) United States Patent
Segal

(10) Patent No.: US 12,810,686 B2
(45) Date of Patent: Nov. 24, 2026

(54) METHOD AND SYSTEM FOR GENERATING AND DISPLAYING VARIABLE NUMBERS OF SYMBOLS FOR USE IN A SYMBOL MATCHING GAME

(71) Applicant: Blastworks Limited, London (GB)

(72) Inventor: Mark Segal, London (GB)

(73) Assignee: Blastworks Limited, London (GB)

( * ) Notice: Subject to any disclaimer, the term of this patent is extended or adjusted under 35 U.S.C. 154(b) by 201 days.

(21) Appl. No.: 18/672,431

(22) Filed: May 23, 2024

(65) Prior Publication Data

US 2024/0404365 A1 Dec. 5, 2024

Related U.S. Application Data

(60) Provisional application No. 63/469,904, filed on May 31, 2023.

(51) Int. Cl.
*G07F 17/32* (2006.01)

(52) U.S. Cl.
CPC .......... *G07F 17/326* (2013.01); *G07F 17/329* (2013.01)

(58) Field of Classification Search
CPC ............. G07F 17/3213; G07F 17/3244; G07F 17/326; G07F 17/329
See application file for complete search history.

(56) References Cited

U.S. PATENT DOCUMENTS

| | | | | |
|---|---|---|---|---|
| 6,997,806 | B2 | 2/2006 | Falciglia, Sr. | |
| 7,717,786 | B1 | 5/2010 | Falciglia, Sr. | |
| 8,337,291 | B2 | 12/2012 | Falciglia, Sr. | |
| 8,556,701 | B2 | 10/2013 | Falciglia, Sr. | |
| 2003/0199303 | A1* | 10/2003 | Weiss | G07F 17/3244 463/17 |
| 2006/0154716 | A1* | 7/2006 | Bozeman | G07F 17/32 463/17 |
| 2006/0160603 | A1* | 7/2006 | Lulek | G07F 17/3276 463/19 |
| 2007/0184887 | A1* | 8/2007 | Cannon | G07F 17/3244 463/16 |
| 2008/0254851 | A1* | 10/2008 | Wright | G07F 17/329 463/17 |
| 2009/0200740 | A1 | 8/2009 | Falciglia, Sr. | |
| 2010/0203948 | A1 | 8/2010 | Falciglia, Sr. | |
| 2013/0130767 | A1* | 5/2013 | Falciglia, Sr. | G07F 17/329 463/19 |
| 2018/0276938 | A1* | 9/2018 | Smith | G07F 17/3258 |

* cited by examiner

*Primary Examiner* — Jason T Yen
(74) *Attorney, Agent, or Firm* — Snell & Wilmer LLP

(57) ABSTRACT

In a symbol matching game, a matrix of columns and rows of players symbols is displayed. A number of game symbol positions are randomly selected and displayed corresponding to each column of the player symbols, such as between 1 and 4. Game symbols are randomly selected and displayed in each selected game symbol positions. The game symbols in each column are compared to the player symbols in corresponding columns for matches and matches are evaluated for winning game outcomes.

19 Claims, 5 Drawing Sheets

METHOD AND SYSTEM FOR GENERATING AND DISPLAYING VARIABLE NUMBERS OF SYMBOLS FOR USE IN A SYMBOL MATCHING GAME

RELATED APPLICATION DATA

The present application claims priority to U.S. Provisional Application Ser. No. 63/469,904, filed May 31, 2023, which application is incorporated herein by reference in its entirety.

FIELD OF THE INVENTION

The present invention relates to methods of presenting and playing games and gaming machines configured to present games.

BACKGROUND OF THE INVENTION

A number of symbol matching games are known, such as Bingo, where a player is provided with a bingo card which displays numbers and the player then attempts to match game numbers associated with selected bingo balls to the numbers on the player card as balls are drawn.

A new symbol matching game and gaming machine for presenting such a game which adds interest and excitement is desired.

SUMMARY OF THE INVENTION

Embodiments of the invention comprise methods of presenting and playing games, as well as gaming machines and systems for presenting games.

In one embodiment, a gaming machine is configured to present a symbol matching game, the gaming machine having a monetary funds accepting mechanism for accepting monetary funds in creating a player credit balance, at least one display device, at least one player input device, a memory device, a controller, and machine-readable code stored in the memory device and executable by the controller to, in response to a wager placed by the player from the player credit balance, cause the at least one display device to display a player symbol matrix of randomly selected player symbols, the player symbol matrix having a plurality of N columns, machine-readable code executable by the controller to cause the controller to randomly select a number of game symbol positions corresponding to each column of the player symbol matrix and to cause the at least one display device to display a game symbol window corresponding to each of the selected number of game symbol positions in a game symbol matrix having N columns aligned with the N columns of the player symbol matrix, machine-readable code executable by the controller to cause the controller to randomly select a game symbol corresponding to each of the number of game symbol positions and cause the at least one display device to display the game symbols in the positions, and machine-readable code executable by the controller to cause the controller to determine matches of any displayed game symbols to player symbols in corresponding columns of the player symbol matrix and the game symbol matrix, and to determine if one or more matches comprise at least one predetermined winning outcome of the game.

In one embodiment, the player symbol matrix has a plurality of N columns and M rows and the game symbol matrix has N columns and M rows. In some embodiments, N=M. In one embodiment, the game symbol positions comprises between 0 and M for each of the N columns, or may comprises at least 1 for each of the N columns.

In one embodiment, the graphically displayed game symbol windows display a first indicator before being transformed to display the game symbols. The indicator may comprise, as one example, a SPIN indicator.

In another embodiment, a game system comprises at least one video display; a processor; a memory; a database stored in the memory, the database storing information regarding a plurality of symbols; machine-readable code stored in the memory and configured to cause the processor to implement at least a first random number generator (RNG) which generates an output; machine-readable code stored in the memory and configured to cause the processor to: a) in response to a wager placed by the player, output information for use by a video display device to graphically display a player symbol matrix of player symbols randomly selected, using the output of the at least a first RNG, from the plurality of symbols, the player symbol matrix having a plurality of N columns; b) randomly select, using the output of the at least a first RNG, a number of game symbol positions corresponding to each column of the player symbol matrix and outputting information for use by the display device to graphically display a game symbol window corresponding to each of the number of game symbol positions in a game symbol matrix having N columns aligned with the N columns of the player symbol matrix; c) randomly select, using the output of the at least a first RNG, a game symbol corresponding to each of the number of game symbol positions and outputting information for use by the display device to graphically transform the game symbol windows to display the game symbols in the positions corresponding thereto; d) determine matches of any of the game symbols to player symbols in corresponding columns of the player symbol matrix and the game symbol matrix; and e) determine if one or more matches comprise at least one predetermined winning outcome.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of playing and presenting games, gaming machines and gaming systems. In a preferred embodiment, the methods of game play and presentation are implemented via a gaming machine or gaming system. Such a gaming machine may have various configurations.

The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
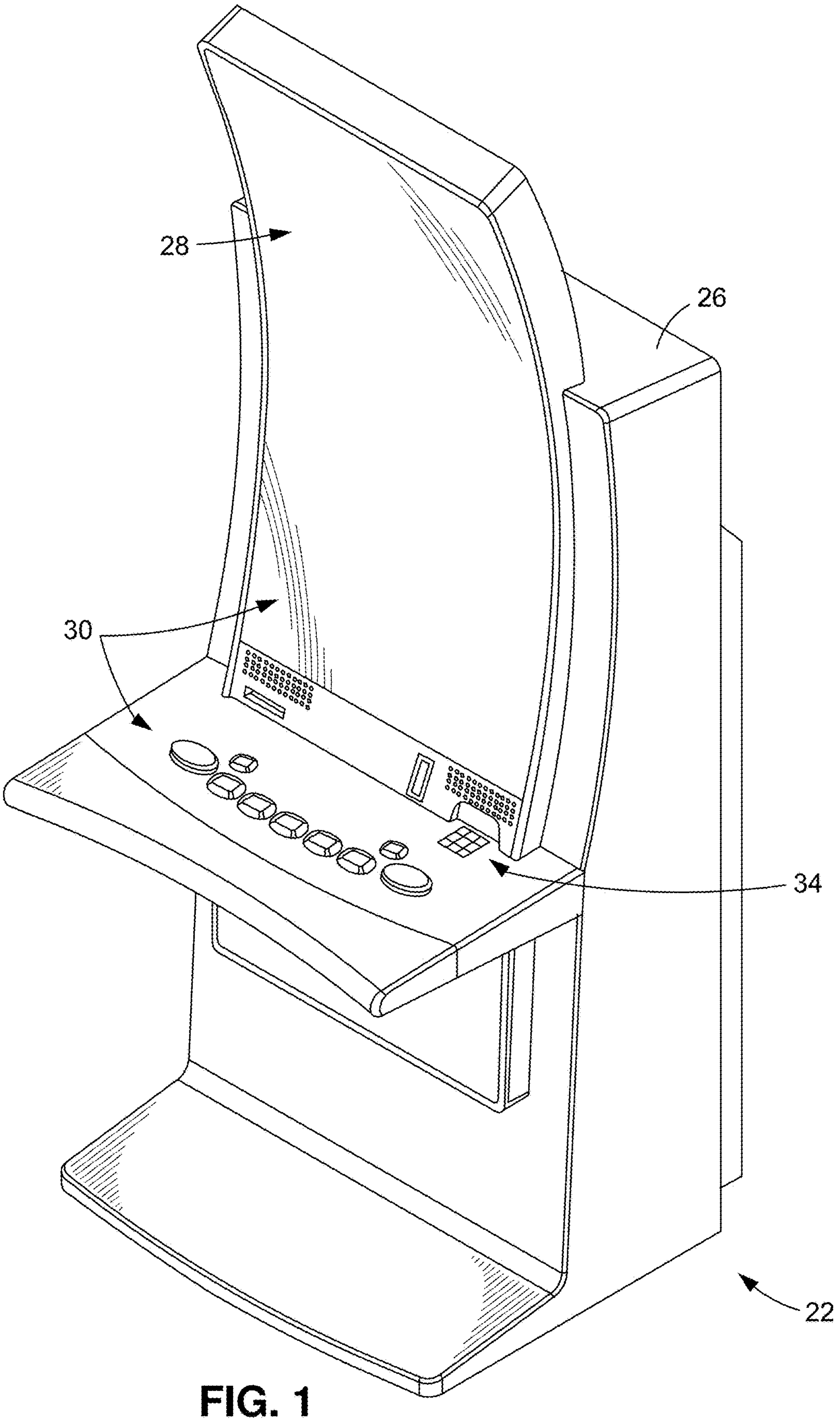
FIG. 1 illustrates a gaming machine in accordance with an embodiment of the invention.

One configuration of a gaming machine 22 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device 28 configured to display game information. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. The gaming machine 22 might include more than one display device 28, such as two or more displays 28 which are associated with the housing 26. The gaming machine 22 might also include a top box or other portion. Such a top box might include one or more display devices 28, such as in addition to one or more main displays which are associated with the housing 26. Also, the gaming machine 22 might include side displays (such as mounted to the exterior of the housing 26) and might include multiple displays of differing sizes. The video displays 28 may have a processor, such as a graphics processor, for processing an output of the gaming machine processor and causing graphical information to be displayed thereby.

While the display devices may comprise one or more video displays, in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

As described in more detail below, the gaming machine 22 is preferably configured to present one or more games upon a player making a monetary payment or wager. In this regard, as described in more detail below, the gaming machine 22 includes a mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to "cash out" of the gaming machine, or to provide various other inputs.

In one preferred embodiment, the gaming machine 22 includes at least one microprocessor or controller for controlling the gaming machine, including receiving player input and sending output signals for controlling the various components or peripheral devices of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display device 28 (such as information comprising displayed game symbols, as detailed below), for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in tables or other forms (including, but not limited to look-up tables, pay tables and other information, including tracked game play information). The gaming machine 22 may also include one or more random number generators for generating random numbers (such as implemented by a random number generator software module stored in the memory and executable by the processor or controller), such as for use in selecting symbols (including game and player symbols, as detailed below) and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine readable code or instructions (e.g. software) which are configured to implement the game. In this regard, the gaming machine is specially configured to present the game of the invention via specific software and/or hardware which causes the gaming machine to operate uniquely. For example, the controller of the gaming machine 22 may be configured to detect a wager, such as a signal from a player's depressing of the "bet one" button (such as one of the buttons 30). Upon such an event and/or the player otherwise signaling the gaming machine to present the game, the controller may be configured to cause the at least one display device 28 to display unique information, such as a unique graphical interface or unique game display, including game symbols or other game information (such as graphically represented images of symbols, as described below). The controller may accept input from a player of game inputs, such as a request to spin reels or the like, via the one or more player input devices of the gaming machine 22. As indicated above, the machine readable code may be configured in various manners, such as by having various "modules" of software which are designed to implement specific features of the game play or game presentation.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. The gaming machine 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, the gaming machine 22 might include a coin acceptor for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications links, such as to enable the transfer of funds from the player to the gaming machine or system).

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button (such as implemented via one of the buttons 30) or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and associated keypad. Such player tracking devices are well known and may permit the game operator to track play of players of the gaming machine. The tracked play may be utilized to offer player bonuses or awards.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in FIG. 1 is only exemplary of one embodiment of a gaming machine. For example, it is possible for the gaming machine to have various other configurations, including different shapes and styles and having different components than as just described.

For example, instead of comprising a "casino"-style gaming machine, it is possible for the game of the invention to be presented on a computing device, including at a home or office computer or a player's mobile electronic device such as a PDA, phone or the like. In one embodiment, a player might log in to a casino server and the controller of the casino server may cause game information to be delivered to the player's computer via a communication link and then be displayed on a display of the player's computer. The communication link might comprise or include the Internet, a casino network such as a wired or wireless LAN, or combinations of public and/or private networks including wired and/or wireless links. In such a configuration it will be noted that the term "controller" may comprise more than one device. For example, in a server-based environment, a controller at a server may generate game information and transmit that information to a local controller at a gaming machine or a player's computer or other electronic device. The local controller at the gaming machine or the player's computer or other electronic device may then cause game information to be displayed on one or more associated displays.

The gaming machine 22 may, as noted above, be part of a system which includes other devices. For example, the gaming machine 22 may communicate with one or more casino systems, such as a player tracking server or system, an accounting system or server, a ticketing system, a bonusing system, a tournament system, other gaming machines, and external devices.

One embodiment of a method of playing and presenting a game in accordance with an embodiment of the invention will be described with reference to FIG. 2. In one or more embodiments, the steps may be implemented relative to a gaming device or system which includes a processor, a memory and machine-readable code stored in the memory for implementing the steps.

In a first step S1, a player may be required to place a wager, or purchase a play or spin or the like. This step may comprise the player associating monetary value funds with the gaming machine 22 and then placing a wager of one or more credits, such as by pressing a "spin" button or the like, which wager input may be received by the processor of the gaming machine or system.

Figure 2:
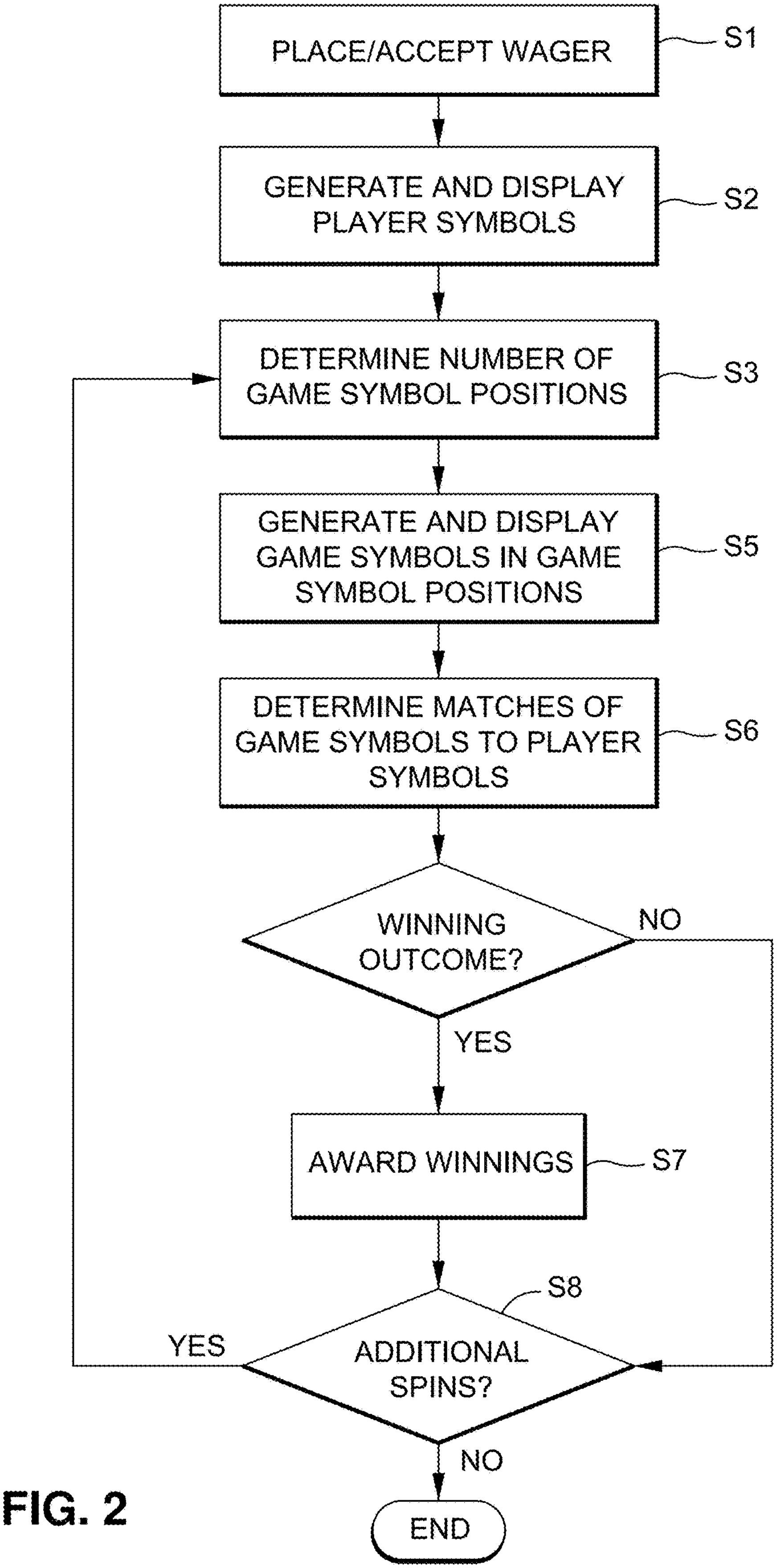
FIG. 2 is a flow chart which illustrates a method of the invention.
Figure 3:
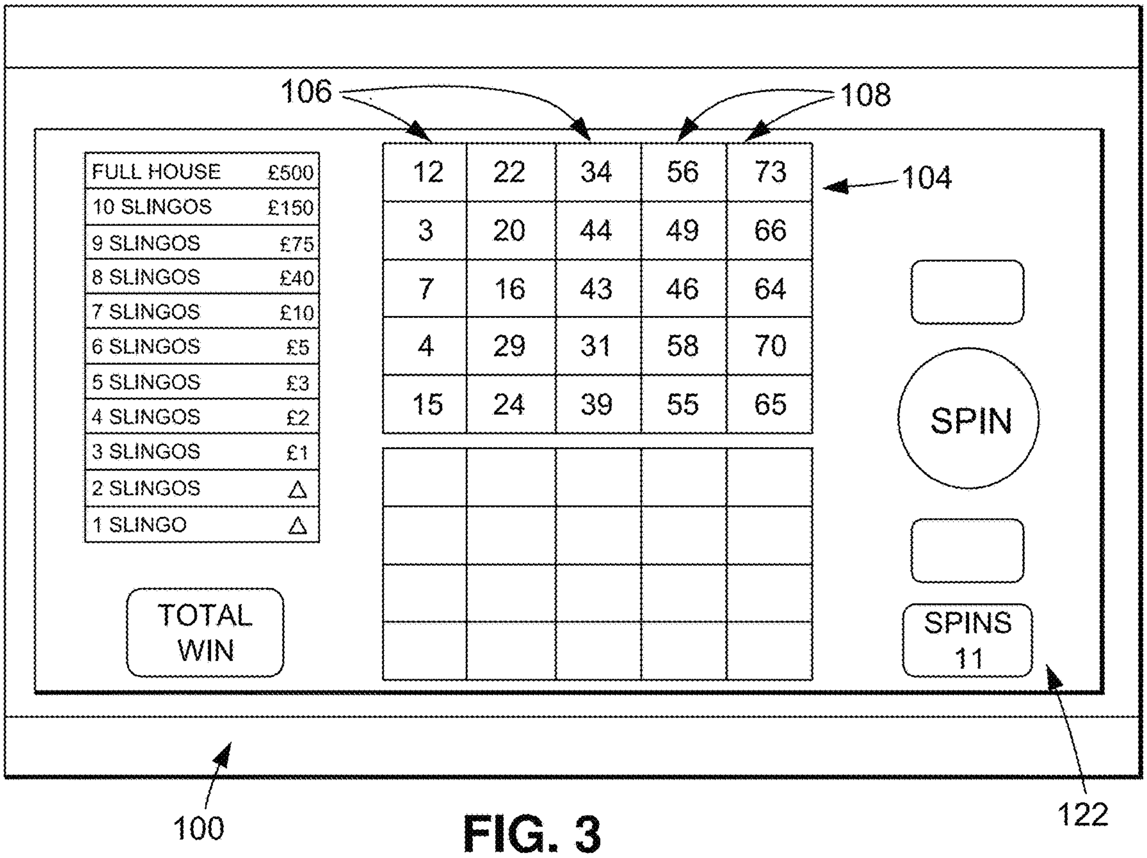
FIGS. 3-8 illustrate a sequence of game play in accordance with a game of the present invention.

Referring to FIG. 2, in a step S2, a set of player symbols 108 is generated and displayed (such as illustrated in FIG. 3). This step may comprise the processor of the gaming machine 22 randomly selecting a plurality of symbols from a set of symbols and then outputting information which causes the video display(s) 28 of the gaming machine 22 to graphically display those symbols. As illustrated in FIG. 3, in one configuration, the processor of the gaming machine 22 may be configured to display a graphical user interface (GUI) 100 which includes a player symbol matrix 104, such as which defines M rows and N columns (e.g. an M×N matrix) of player symbol blocks or cells 106 (although in other embodiments, the matrix may have other configurations, such as M×N where M and N are unequal, or where the block or cells are not arranged in a matrix, such as where they may be in columns but have different numbers of cells in the columns, of even where the cells are arranged irregularly). In the embodiment described herein N is 5 and there are 25 player symbol blocks or cells 106 of the matrix as is customary in a traditional Bingo game card (though N could be other numbers, such as 2 or 4 or 10, as examples).

Preferably, for play of the game, player symbols 108 are displayed in each of the cells 106 of the player symbol matrix 104. Such indicia or symbols may have various forms, including letters, numbers, pictures, dots or the like. In a preferred embodiment, the symbols comprise numbers, and in a most preferred embodiment, the numbers for each player symbol block or cell 106 in each column are randomly selected from a range or set of numbers. In one embodiment, for the five player symbol blocks or cells 106 corresponding to the first (leftmost) column of the player symbol matrix 104, the number set or range is 1 to 15. The number set or range for the second (second leftmost) column of player symbol blocks or cells 106 of the player symbol matrix 104 is 16 to 30. The number set or range for the third (center) column of player symbol blocks or cells 106 of the player symbol matrix 104 is 31 through 45. The number set or range for the fourth (second rightmost) column of player symbol blocks or cells 106 of the player symbol matrix 104 is 46 through 60. Lastly, the number set or range for the fifth (rightmost) column of player symbol blocks or cells 106 of the player symbol matrix 104 is 61 through 75. At least one first random number generator may be used to select the numbers for each player symbol block or cell 106 of each column from the designated range, and may further be designed such that a single number is not displayed more than once in the player symbol matrix 104.

Of course, the set of player symbols 108 displayed in the player symbol matrix 104 might comprise other numbers (such as selected from different sets of numbers), or other symbols.

Referring again to FIG. 2, in a step S3, a number of game symbol positions are generated. In one embodiment, at least one second random number generator is configured to randomly select a number of game symbol positions corresponding to each of the N columns of the player symbol matrix 104. In one configuration, may comprise 0 to M for each of the N columns, where M is the number of rows. In a preferred embodiment, however, where there are 5 rows for each N columns, this comprises 1 to 4 game symbol positions. Thus, for an embodiment where the player symbol matrix 104 has 5 columns, a number of game symbol positions are selected or generated for each of the 5 columns, where the number of game symbol positions for each of the 5 columns may be between 1 and 4.

In one embodiment, the number of selected game symbol positions are indicated to the player, such as by displaying game symbol windows 110 in the game symbol matrix 112 which is positioned below the player symbol matrix 104 (preferably with columns thereof aligned).

Figure 4:
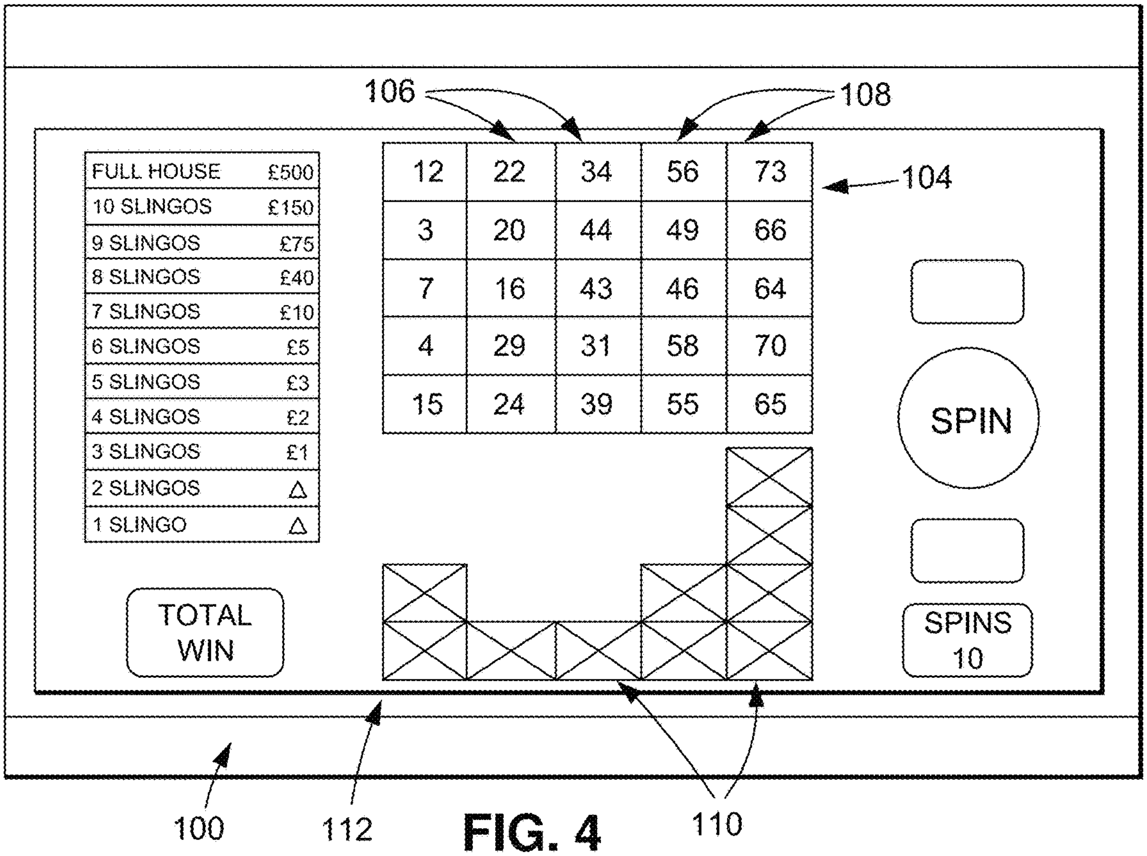

FIG. 4 illustrates such a configuration in which the processor generates and provides an output which causes the display 28 of the gaming machine 22 to display an updated graphical user interface 100 which displays both the player symbol matrix 104 (populated with player symbols 108) and the selected number of game symbol windows 110 in the game symbol matrix 112. In this example, 2 game symbol windows 110 have been selected corresponding to the first column of the game symbol matrix 112, 1 each for the next two columns thereof, 2 for the fourth column thereof, and then 4 for the fifth or last column thereof.

Figure 6:
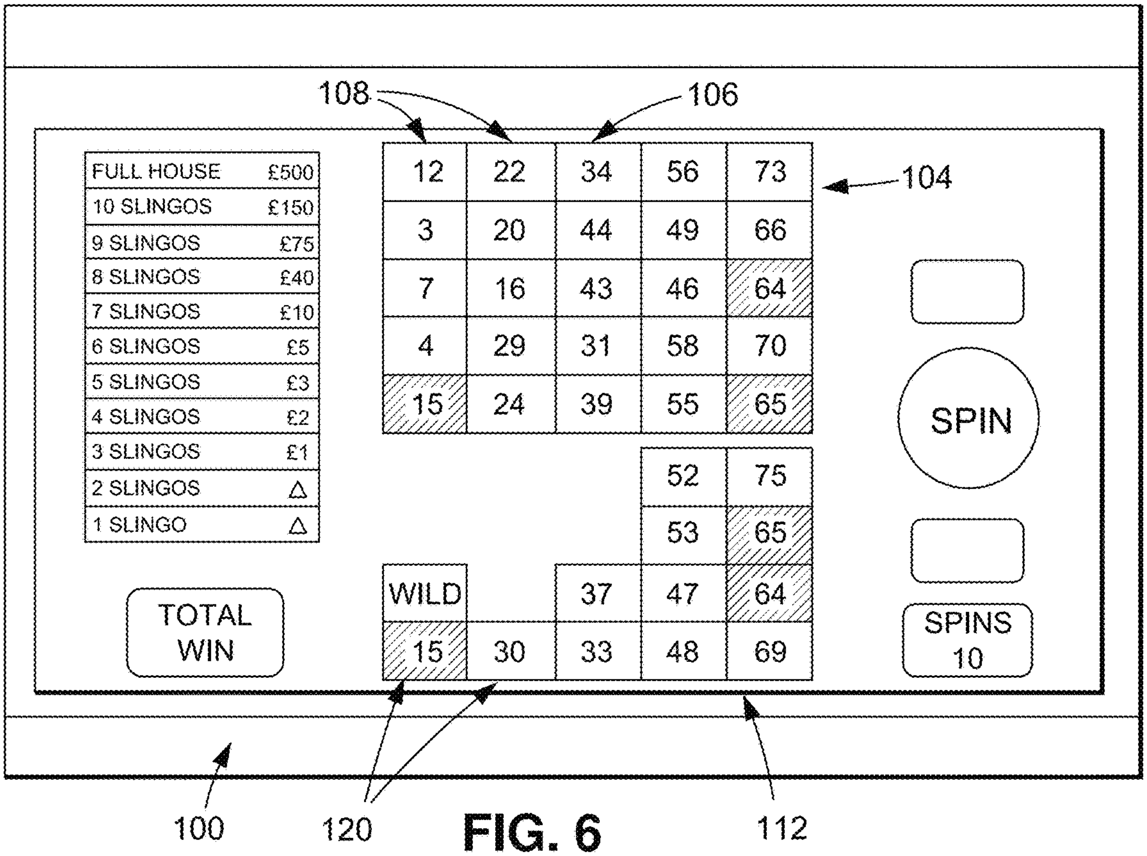

Referring again to FIG. 2, in a step S5, game symbols 120 are preferably randomly selected, such as by use of at least one third random number generator, for each game symbol window (as shown in the example in FIG. 6). In a preferred embodiment, the symbols for each game symbol window are randomly selected from the same sets of numbers as the player symbols—e.g. from the numbers 1-15 for game symbol positions in the first column of the game symbol matrix 112, from the numbers 16-30 for game symbol position in the second column of the game symbol matrix area 112, etc.

In one embodiment, the game symbols 120 may include special symbols, such as WILD symbols or the like, which may also be randomly selected for the different game symbol windows 110. The special symbols might have particular characteristics, such as described below.

Figure 5:
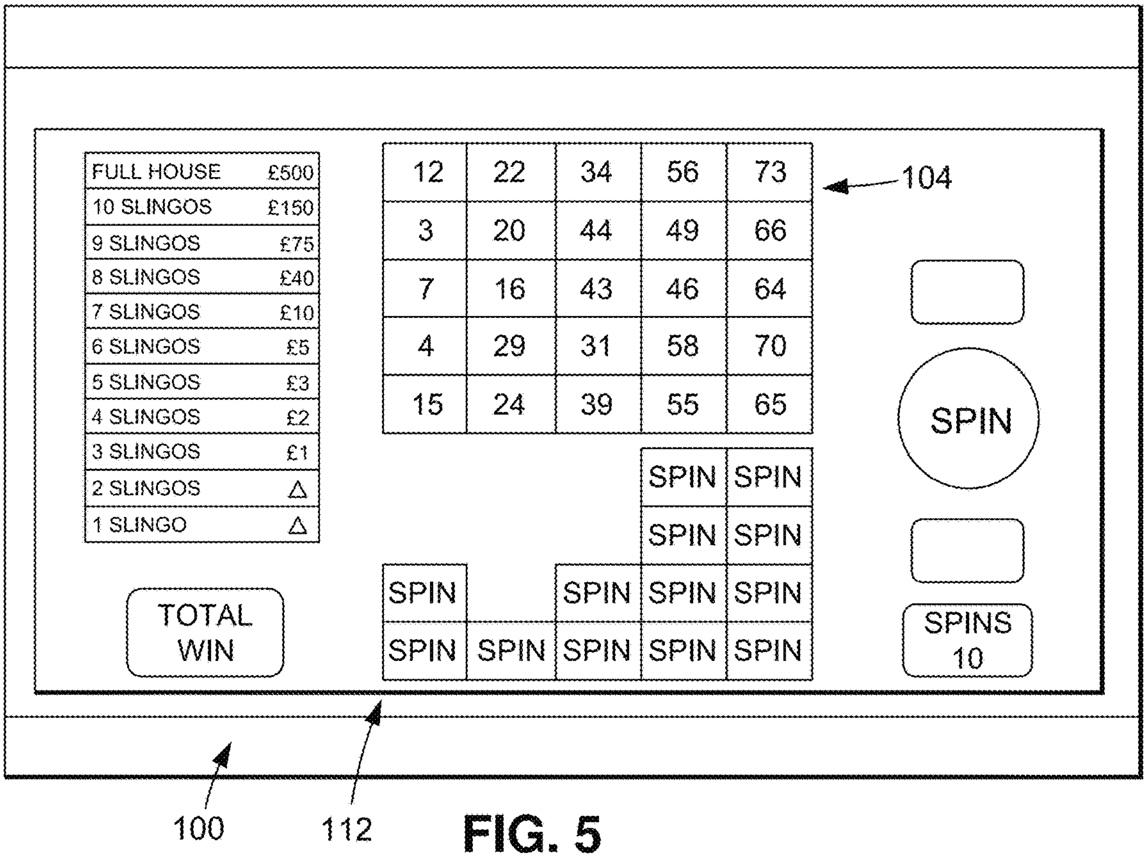

The selected game symbols 120 may be displayed in various manners. As illustrated in FIG. 5, in one embodiment, the processor may cause the graphical user interface 100 to display a simulated reel spin in each of the game symbol windows 110. As illustrated in FIG. 6, the graphical user interface 100 is ultimately transformed to display the selected game symbols in the game symbol windows 110 of the game symbol matrix 112. Of course, in an embodiment where the positions of the game symbol matrix 112 correspond to a physical reel, the actual reels may be rotated and stopped to display a game symbol at the position.

Figure 7:
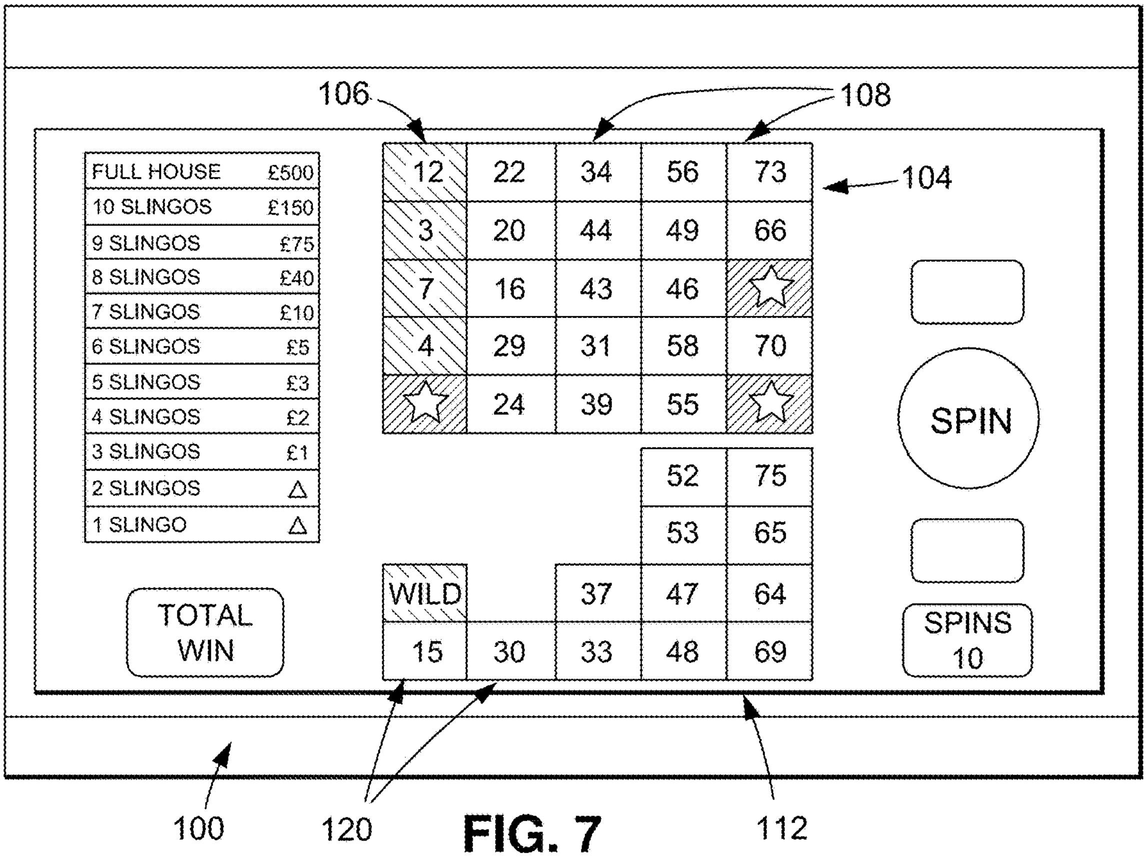
Figure 8:
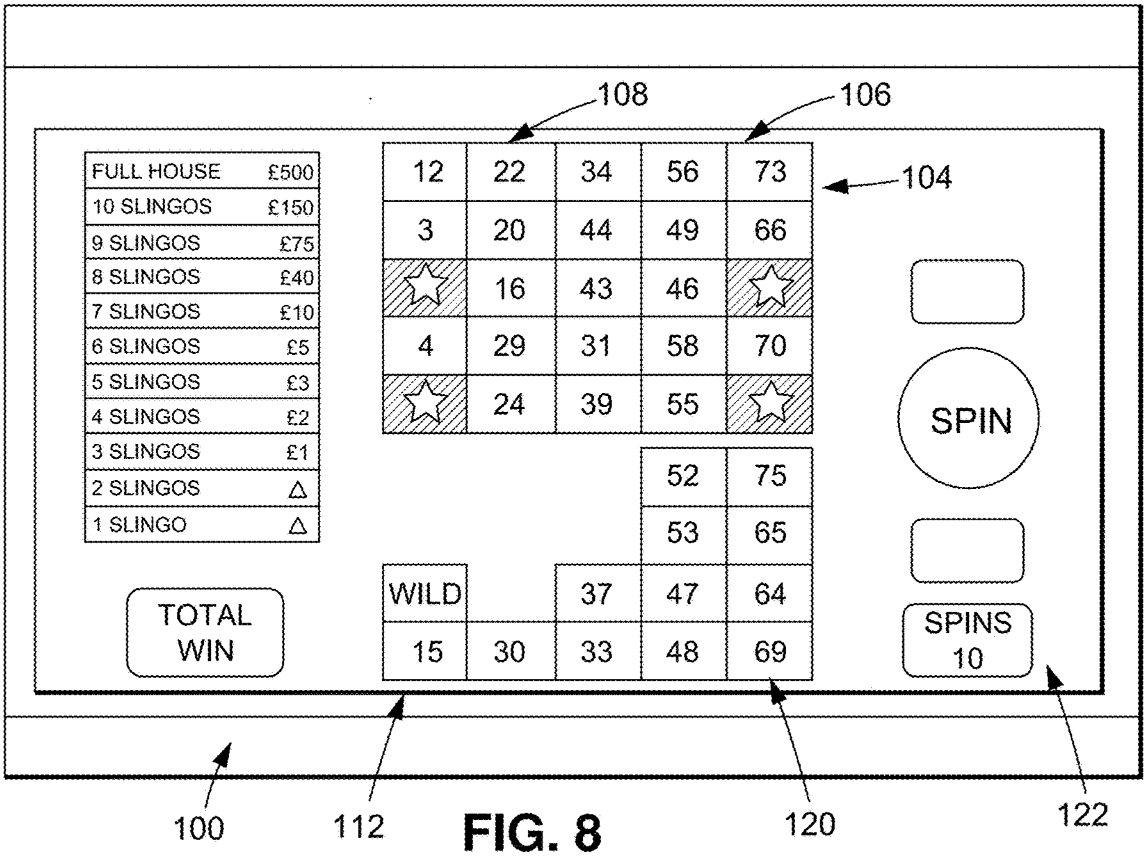

Referring again to FIG. 2, in a step S5, the game symbols 120 displayed in each column of the game symbol matrix 112 are compared to the player symbols 108 in each player symbol block or cell 106 of the player symbol matrix 104 to determine if any matches exist. In the event matches exist, those matches may be indicated, such as by transforming the graphical user interface 100 so that the player symbol blocks or cells 106 indicate such a match. For example, as illustrated in FIGS. 7 and 8, a match might be indicated by graphically illustrating a STAR symbol in the player symbol block or cell 106 where the game symbol of that column matched the player symbol in that column.

As indicated above, certain game symbols might have particular characteristics. For example, a special game symbol might comprise a WILD game symbol. The WILD symbol may take the characteristic of any player symbol, such as selected by the player. As one example, as illustrated in FIG. 7, when a WILD game symbol appears in a column of the game symbol matrix 112, the player may be permitted to select any unmatched player symbol in the corresponding column of the player symbol matrix 104.

Referring again to FIG. 2, in a step S6, after matches of game symbols to player symbols 108 have been determined (and preferably indicated), an outcome of the game may be determined. This may comprise determining whether one or more matches comprises a predetermined winning outcome. In one embodiment, for example, a winning outcome may comprise matching of all of the player symbols 108 of at least one row, at least one column, or at least one diagonal of the player symbol matrix 104 (each of which may be referred to as a "SLINGO"), or other winning outcomes, such as may be designated by a paytable of winning outcomes and associated awards. Winnings may then be awarded/paid for winning outcomes as in step S7 of FIG. 2.

In one embodiment, the player may be provided with multiple opportunities to match game symbols with the player symbols, such as part of the same game or by placing an additional wager, such as in step S8 of FIG. 2. For example, the player might be provided with the opportunity to match multiple sets of randomly generated and displayed game symbols in "rounds" or "spins" (chosen and displayed in the manner described above, such as where for each round or spin, a number of game symbols is randomly generated for each column of the game symbol matrix 112 and then game symbols are randomly displayed in each game symbol window 110) to the single set of player symbols, such as part of the payment for a single game. For example, the game might comprise a single round or spin, but preferably comprises at least two or more, such as in one preferred embodiment, 11 rounds or spins. In some embodiments, the player may be permitted by purchase additional rounds or spins, such as upon making an additional payment at the beginning of the game or at one or more points during the game. This provides the player with the opportunity to obtain a higher number of matches, and thus a winning outcome. In one embodiment, a player might also be permitted to purchase additional rounds or spins. In one embodiment, the graphical user interface 100 may display a number of remaining rounds or spins, such as with a counter or other visual indicators. For example, as illustrated in FIG. 3, at the start of the game, a remaining spin count 122 may indicate an initial number of remaining spins, such as 11. After each spin, that count may be reduced, such as illustrated in FIG. 8, where the spin account after the first spin, but before the second one, is 10. In such a configuration, the determination of matches for evaluation as to winning outcomes may occur after the repeated spins have been completed and all matches are known.

Upon the presentation of a new game, the graphical user interface 100 is preferably updated to display a new set of player symbols in the player symbol matrix 104, with the game repeating in the manner illustrated in FIG. 2 and described above.

In one embodiment, the player and game symbols are selected from one or more sets of symbols, such as stored in a database in a memory. The set of symbols might comprise, for example, the numbers 1-75, or might comprise 5 subsets of numbers having the groupings noted above.

As indicated, in one or more embodiments, player symbols and game symbols are randomly selected. In one embodiment, machine-readable code stored in a memory is executed by a processor of the gaming machine 22 or system to implement the one or more RNGs, where each RNG has an output. The output of the RNG(s) to make selections of the symbols from the one or more stored set of symbols. In some embodiments, different RNGs may be implemented and used relative to the random selection of different features, such as the player symbols and the game symbols.

In one embodiment, the processor of the gaming device or system generates outputs, such as information for use by a video display (such as by a processor/graphics processor thereof) for causing graphical information to be displayed by the video display.

The game may have other configurations and features. For example, as described above, the player symbol matrix 104 may display player symbol blocks or cells 106 having other configurations, such as other than in an M×N matrix. In a preferred embodiment, the game symbol matrix 112 is displayed below the player symbol matrix 104, with columns of the two matrices aligned. However, the game symbol matrix 112 might be displayed above or even to the side of the player symbol matrix 104.

As indicated herein, in one embodiment, the player symbols and game symbols may be displayed graphically via graphical user interface on one or more video displays of the gaming machine 22. However, the player and game symbols might be displayed by one or more physical reels, such as which rotate and are stopped or stop to display one or more symbols.

Further, as indicated herein, while the game may be presented on a gaming machine 22, the game might be presented via other devices and systems, such as on player mobile communication device, computer or the like. In some embodiments, the game may be implemented by a game application which is loaded into the memory of the device and then executed by a processor thereof. In some embodiments, game data, such as generated random numbers or selected symbols might be generated remotely, such as at a remote game server, and display device (such as a player computing or communication device) might be configured to display the game information.

In one embodiment, the player symbol matrix and game symbol matrix may both be displayed by a single display, such as in the relationship illustrated in the figures. However, in other embodiments, the player symbol matrix might be displayed by one video display and the game symbol matrix might be displayed by a second video display, such as located the first video display.

A particular advantage of the invention is the use of technology to generate and graphically transform displayed information for use in generating and displaying game information. One particular advantage of the invention is the random generation and then transformation of a display to display a variable number of game symbol positions or windows, where a player is thus provided information regarding the number of game symbols which will be displayed for matching to each column of player symbols, wherein this visual indication adds excitement to the game because the player knows that a larger number of game symbols is likely to yield more player symbols matches. Further, game excitement is increased by the visual transformation of the game symbol windows to actual displayed game symbols for matching to the player symbols.

The technology described herein allows each spin or round of the game to have different numbers of selected game symbol positions and game symbols, all selected in real-time and randomly during game play. This enables the game to be played at a fast pace (such as compared to Bingo games where, for example, bingo balls may be manually drawn one at a time and may then be manually matched to the numbers on the player's card, etc.).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming machine comprising:

a monetary funds accepting mechanism for accepting monetary funds in creating a player credit balance;

at least one display device;

at least one player input device;

a memory device;

a controller; and machine-readable code stored in said memory device and executable by said controller to:

a) in response to a wager placed by said player from said player credit balance, cause said at least one display device to graphically display a player symbol matrix of randomly selected player symbols, said player symbol matrix having a plurality of N columns;

b) cause said at least one display device to graphically display a game symbol matrix having N columns aligned with said N columns of said player symbol matrix, said game symbol matrix having a plurality of potential game symbol positions in each of said N columns;

c) randomly select a number of said potential game symbol positions corresponding to each column of the player symbol matrix, wherein the randomly selected number of potential game symbol positions differs for at least two of said N columns, and cause said at least one display device to graphically transform said game symbol matrix to visually designate, prior to display of any game symbol, only the randomly selected number of potential game symbol positions in each column as an active game symbol window corresponding to each of said number of game symbol positions, whereby said transformation indicates to said player, before any game symbol is displayed, the number of active game symbol windows that will be available for matching in each column;

d) randomly select a game symbol corresponding to each of said active game symbol windows and cause said at least one display device to graphically transform said active game symbol windows to display said game symbols in said positions corresponding thereto;

e) determine matches of any displayed game symbols to player symbols in corresponding columns of said player symbol matrix and said game symbol matrix; and f) determine if one or more matches comprise at least one predetermined winning outcome of said game.

2. The gaming machine in accordance with claim 1, wherein said player symbol matrix has a plurality of N columns and M rows and said game symbol matrix has N columns and M rows.

3. The gaming machine in accordance with claim 2, wherein N=M.

4. The gaming machine in accordance with claim 3, wherein said number of game symbol positions comprises between 0 and M for each of said N columns.

5. The gaming machine in accordance with claim 3, wherein said number of game symbol positions comprises at least 1 for each of said N columns.

6. The gaming machine in accordance with claim 1, wherein said graphically displayed game symbol windows displays a first indicator before being transformed to display said game symbols.

7. The gaming machine in accordance with claim 1, wherein said first indicator comprises a SPIN indicator.

8. The gaming machine in accordance with claim 1, wherein said machine-readable code is configured to cause said controller to repeat steps c)-e) at least two times.

9. The gaming machine in accordance with claim 1, wherein said matches comprise a winning outcome if all player symbols in at least one row, at least one column or at least one diagonal of said player symbol matrix are matched by said game symbols.

10. A game system comprising:

at least one video display device;

a processor;

a memory;

a database stored in said memory, said database storing information regarding a plurality of symbols;

machine-readable code stored in said memory and configured to cause said processor to implement at least a first random number generator (RNG) which generates an output;

machine-readable code stored in said memory and configured to cause said processor to:

a) in response to a wager placed by said player, output information for use by a video display device to graphically display a player symbol matrix of player symbols randomly selected, using said output of said at least a first RNG, from said plurality of symbols, said player symbol matrix having a plurality of N columns;

b) output information for use by said video display device to graphically display a game symbol matrix having N columns aligned with said N columns of said player symbol matrix, said game symbol matrix having a plurality of potential game symbol positions in each of said N columns;

c) randomly select, using said output of said at least a first RNG, a number of game symbol positions corresponding to each column of the player symbol matrix, wherein the randomly selected number of potential game symbol positions differs for at least two of said N columns, and outputting information for use by said video display device to graphically transform said game symbol matrix to visually designate, prior to display of any game symbol, only the randomly selected number of potential game symbol positions in each column as an active game symbol window corresponding to each of said number of game symbol positions, whereby said transformation indicates to said player, before any game symbol is displayed, the active game symbol windows that will be available for matching in each column;

d) randomly select, using said output of said at least a first RNG, a game symbol corresponding to each of said number of game symbol positions and outputting information for use by said video display device to graphically transform said game symbol windows to display said game symbols in said positions corresponding thereto;

e) determine matches of any of said game symbols to player symbols in corresponding columns of said player symbol matrix and said game symbol matrix; and f) determine if one or more matches comprise at least one predetermined winning outcome.

11. The game system in accordance with claim 10, wherein said machine-readable code stored in said memory is configured to cause said processor to randomly select, using said output of said first RNG, a variable number of game symbol positions between 1 position and X positions, wherein X is 2 or more.

12. The game system in accordance with claim 10, wherein said plurality of symbols comprise the numbers 1-75.

13. The game system in accordance with claim 12, wherein N=5, and said machine-readable code causes said processor to randomly select player symbols from numbers 1-15 for a first of said N columns, player symbols from numbers 16-30 for a second of said N columns, player symbols from numbers 31-45 for a third of said N columns, player symbols from numbers 46-60 for a fourth of said N columns, and player numbers 61-75 from a fifth of said N columns.

14. The game system in accordance with claim 10, wherein said output information comprises information for use by a graphics processor of said video display device.

15. The game system in accordance with claim 10, wherein said player symbol matrix has a plurality of N columns and M rows and said game symbol matrix has N columns and M rows.

16. The game system in accordance with claim 15, wherein N=M.

17. The game system in accordance with claim 16, wherein said number of game symbol positions comprises between 0 and M for each of said N columns.

18. The game system in accordance with claim 16, wherein said number of game symbol positions comprises at least 1 for each of said N columns.

19. The game system in accordance with claim 10, wherein said machine-readable code is configured to cause said controller to repeat steps c)-e) at least two times.

* * * * *